US007766314B2

(12) United States Patent
Mizutani et al.

(10) Patent No.: US 7,766,314 B2
(45) Date of Patent: Aug. 3, 2010

(54) SHEET POST-PROCESSING APPARATUS HAVING EXCELLENT SHEET STACKING CAPABILITY

(75) Inventors: Kikuo Mizutani, Izu (JP); Yoshiaki Sugizaki, Sunto-gun (JP); Hiroyuki Taki, Izunokuni (JP); Takahiro Kawaguchi, Mishima (JP); Yasunobu Terao, Izunokuni (JP); Tomomi Iijima, Mishima (JP); Mikio Yamamoto, Izunokuni (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/101,876

(22) Filed: Apr. 11, 2008

(65) Prior Publication Data

US 2009/0014950 A1 Jan. 15, 2009

Related U.S. Application Data

(60) Provisional application No. 60/949,474, filed on Jul. 12, 2007, provisional application No. 60/949,479, filed on Jul. 12, 2007.

(51) Int. Cl.
*B65G 33/04* (2006.01)
*B65G 39/00* (2006.01)

(52) U.S. Cl. .............. 270/58.07; 270/58.08; 270/58.09; 270/58.11; 270/58.12; 270/58.17; 270/58.27

(58) Field of Classification Search .............. 270/58.07, 270/58.08, 58.09, 58.11, 58.12, 58.17, 58.27
See application file for complete search history.

(56) References Cited

U.S. PATENT DOCUMENTS 6,786,483 B2 * 9/2004 Nishimura et al. .......... 271/270
7,172,186 B2 * 2/2007 Saito et al. ............... 270/58.08
7,568,686 B2 * 8/2009 Terao et al. .............. 270/58.07

FOREIGN PATENT DOCUMENTS

| | | | | |
|---|---|---|---|---|
| JP | PH004-125246 | A | | 4/1992 |
| JP | PH07-228412 | A | | 8/1995 |
| JP | 08069137 | A | * | 3/1996 |
| JP | PH08-69137 | A | | 3/1996 |
| JP | PH09-77341 | A | | 3/1997 |
| JP | P2001-322766 | A | | 11/2001 |
| JP | P2003-128332 | A | | 5/2003 |

* cited by examiner

*Primary Examiner*—Gene Crawford
*Assistant Examiner*—Yolanda Cumbess
(74) *Attorney, Agent, or Firm*—Patterson & Sheridan, LLP

(57) ABSTRACT

A sheet post-processing apparatus discharges and conveys a sheet from a process tray to a storage tray, and decelerates a bundle hook and a paper discharge roller when the bundle hook reaches a discharge start position of a bundle of sheets. At this time, a tangential speed of the paper discharge roller is faster than a movement speed of the bundle hook. Subsequently, the sheet post-processing apparatus stops the paper discharge roller in accordance with a rotation position of the bundle hook, and then decelerates the movement speed of the bundle hook. After the sheets are stacked on the storage tray, the bundle hook accelerates to return to a home position. Additionally, the sheet post-processing apparatus includes a spool 17 having a sheet pressing guide member 16 with a bent portion 16A. When the sheets are conveyed to a process tray 13, the spool 17 is rotated forward to longitudinally align the sheets and then is backwardly rotated to press the sheets using elastic force of the sheet pressing guide member 16, thereby preventing a gap from occurring between the sheets or preventing the sheets from being misaligned.

10 Claims, 13 Drawing Sheets

SHEET POST-PROCESSING APPARATUS HAVING EXCELLENT SHEET STACKING CAPABILITY

CROSS-REFERENCE TO RELATED APPLICATIONS

This application is based upon and claims the benefit of priority from the prior U.S. Patent Application No. 60/949,474, filed on 12 Jul. 2007, and the prior U.S. Patent Application No. 60/949,479, filed on 12 Jul. 2007, the entire contents of which are incorporated herein by reference.

BACKGROUND OF THE INVENTION

1. Field of the Invention

The present invention relates to a sheet post-processing apparatus mounted in an image forming apparatus such as a copying machine, and more particularly, to a sheet post-processing apparatus operable to improve sheet stacking capability of sheets discharged to and stacked on a tray for stacking sheets thereon.

2. Description of the Related Art

In an image forming apparatus such as a copying machine, a sheet post-processing apparatus may be used to perform a post process such as a sorting process or a stapling process to sheets having an image formed thereon. Such a sheet post-processing apparatus stacks the sheets conveyed from the image forming apparatus on a process tray and discharges the sheets having been subjected to the stapling process to a storage tray.

However, when the sheets are not stacked in an aligned state before the sheet post-processing apparatus performs the stapling process, a problem arises in that quality of the stapling process deteriorates.

For this reason, JP-A-2001-322766 discloses a sheet alignment mechanism has been proposed in which a stack paddle is elastically deformed to align the sheets.

However, since a paddle stopper for regulating the elastic deformation of the stack paddle is away from the top surface of the sheets, a problem arises in that the sheets cannot be stably stacked and the sheet end surfaces cannot be aligned in the same direction.

Additionally, when the sheet post-processing apparatus discharges the sheets stacked in a process tray to a storage tray, a problem arises in that quality of the sorting process deteriorates because the sheets are not stacked in an aligned state.

For this reason, JP-A-7-228412 discloses a sheet post-processing apparatus including a belt that is mounted with a hook for extruding the sheets in a direction where the sheets are discharged to the process tray, and a paper discharge roller that has a clutch of a reverse rotation direction, the paper discharge roller being disposed at a position away from a belt pulley mounted with the hook in a downstream side of the process tray in a sheet conveying direction and the paper discharge roller being driven independently. At this time, a tangential speed of the paper discharge roller is set to be faster than a movement speed of the belt mounted with the hook.

However, in such a sheet post-processing apparatus, the belt mounted with the hook is away from the paper discharge roller to be independently driven. That is, a pulley of the belt mounted with the hook does not have the same rotation shaft as the paper discharge roller. As a result, a problem arises in that it is not possible to save a space because the sheet post-processing apparatus cannot be manufactured in a small size.

In addition, U.S. Pat. No. 6,786,483 B2 discloses a sheet processing apparatus in which a discharge belt provided with two bundle discharge levers is driven by a single motor to discharge a bundle of stapled sheets to a stack tray.

However, when discharging the sheets that can be easily bended, the rear end of the sheet is curved so that the bundle discharge levers pinch the rear end of the sheet. As a result, a problem arises in that a sheet conveying error or a sheet discharging error may occur.

BRIEF SUMMARY OF THE INVENTION

It is an object of the invention to provide a sheet post-processing apparatus for improving sheet stacking capability and a sheet stacking method thereof.

In an aspect of the present invention, there is provided a sheet post-processing apparatus including: a process tray which stacks a sheet thereon; a storage tray which stacks the sheet discharged from the process tray thereon; a paper discharge roller which is provided at the end of the process tray in a sheet discharging and conveying direction to discharge the sheet to the storage tray; and a bundle hook which is provided in a bundle discharge belt rotating in the sheet discharging and conveying direction of the process tray to convey the sheet stacked on the process tray in the storage tray direction. During a sheet stacking operation in which the bundle hook starts to discharge and convey the sheet and then passes a sheet rear end contacting portion of the storage tray, a tangential speed of the paper discharge roller and a movement speed of the bundle hook are decelerated, and the movement speed of the bundle hook is set to be slower than the tangential speed of the paper discharge roller in accordance with the position of the bundle hook. Additionally, a sheet pressing guide formed of a flexible member is further provided, and the sheet pressing guide is operated to be rotated backward upon stacking the sheet on the process tray. Accordingly, it is possible to stably perform the discharging and stacking operations without conveying and discharging errors.

DETAILED DESCRIPTION OF THE INVENTION

Figure 1:
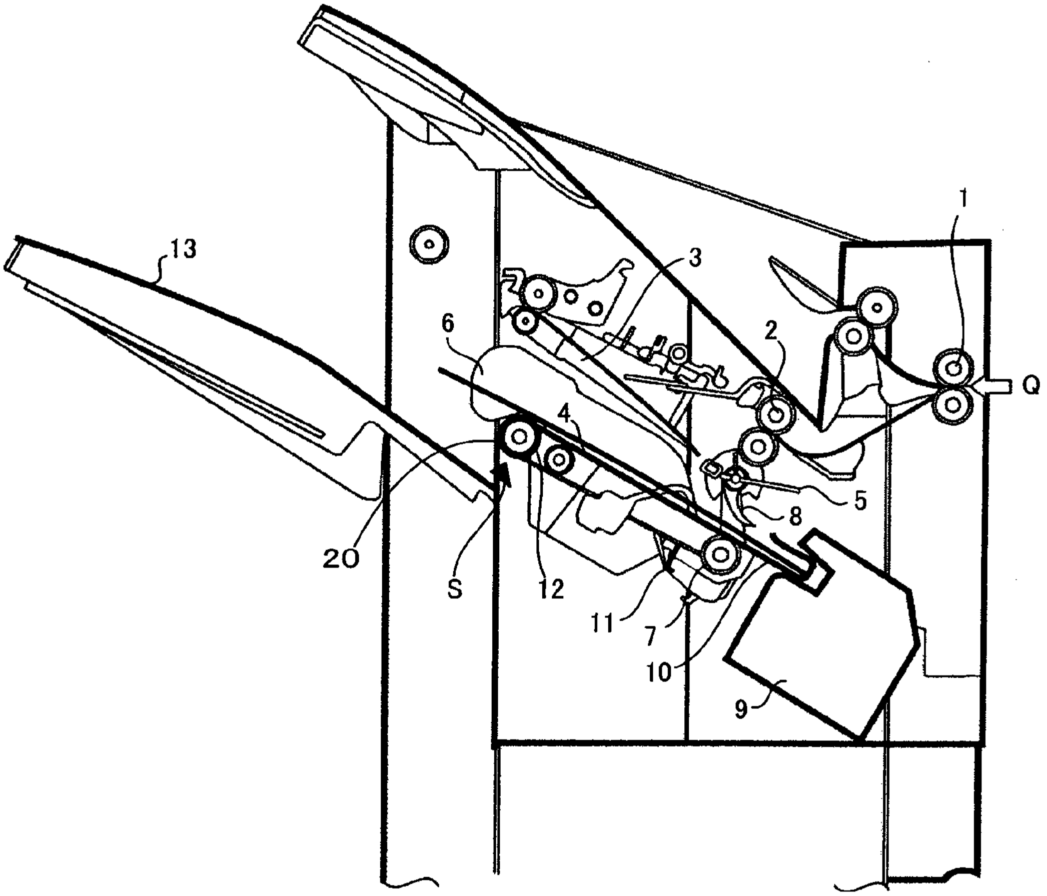
FIG. 1 is a sectional view illustrating a main part of a sheet post-processing apparatus according to an embodiment.

Throughout this description, the embodiments and examples shown should be considered as exemplars, rather than limitations on the apparatus and methods of the present invention.

Hereinafter, a sheet post-processing apparatus for improving sheet stacking capability (hereinafter, referred to as 'sheet post-processing apparatus') according to an embodiment of the invention will be described in detail with reference to the accompanying drawings. The sheet post-processing apparatus according to the embodiment includes a process tray as a stacker which carries out discharging and stacking operations of conveyed sheets to perform a post process thereto and a storage tray as a stacker which carries out discharging and stacking operations of a bundle of sheets having been subjected to the post process. In the drawings, the same reference numerals are given to the same components, and thus the repetitive description thereof will be omitted.

(Outline of Sheet Post-processing Apparatus)

Figure 2:
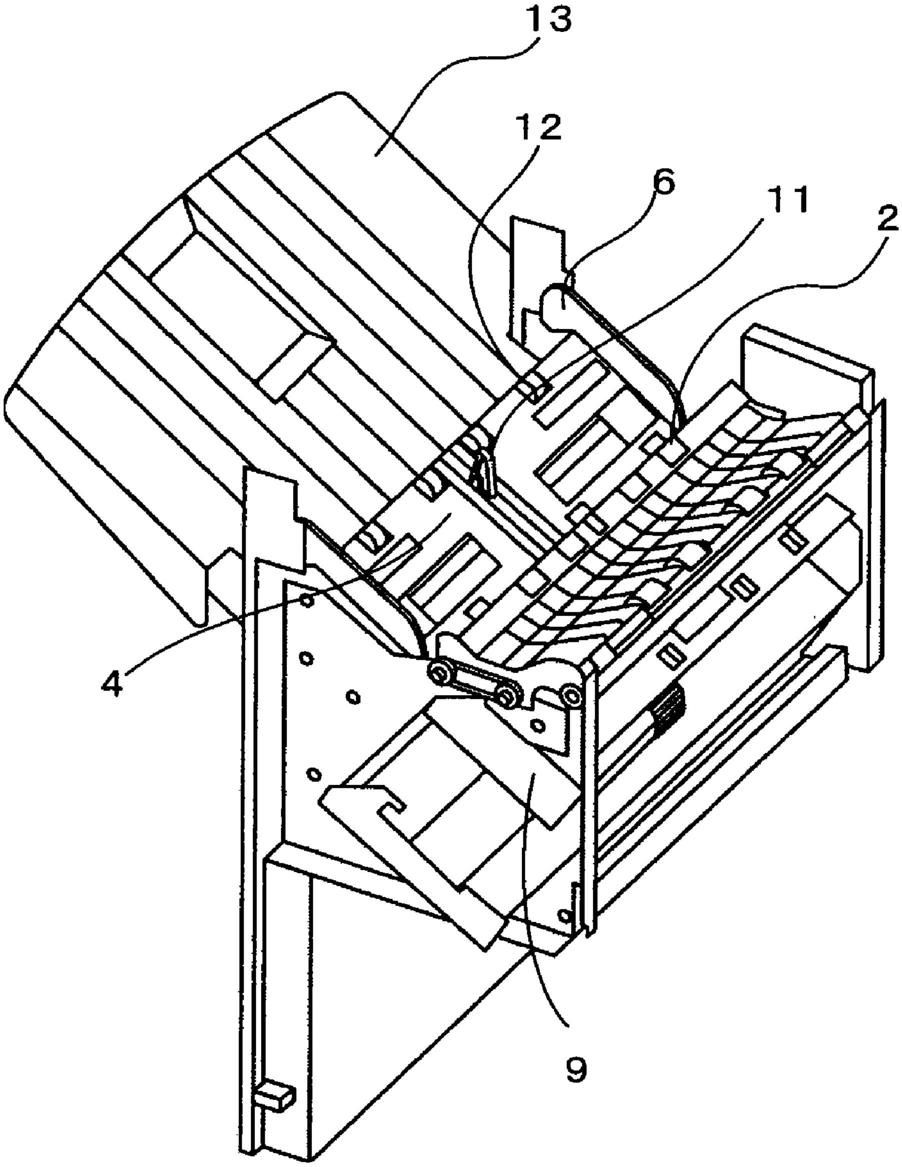
FIG. 2 is an external perspective view illustrating a part around a process tray 4 of the sheet post-processing apparatus according to the embodiment.
Figure 3:
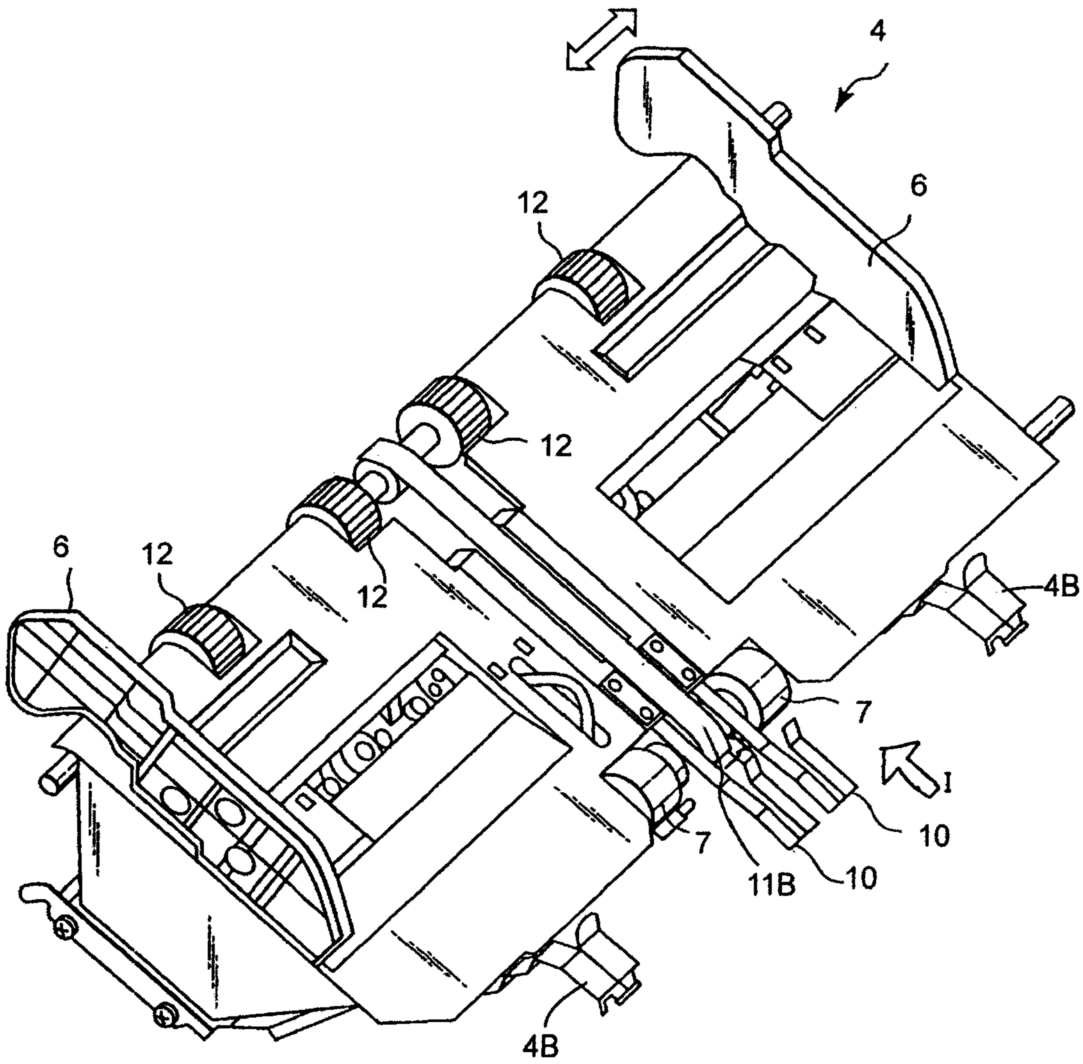
FIG. 3 is an external perspective view illustrating the part around the process tray 4 of the sheet post-processing apparatus according to the embodiment.
Figure 4:
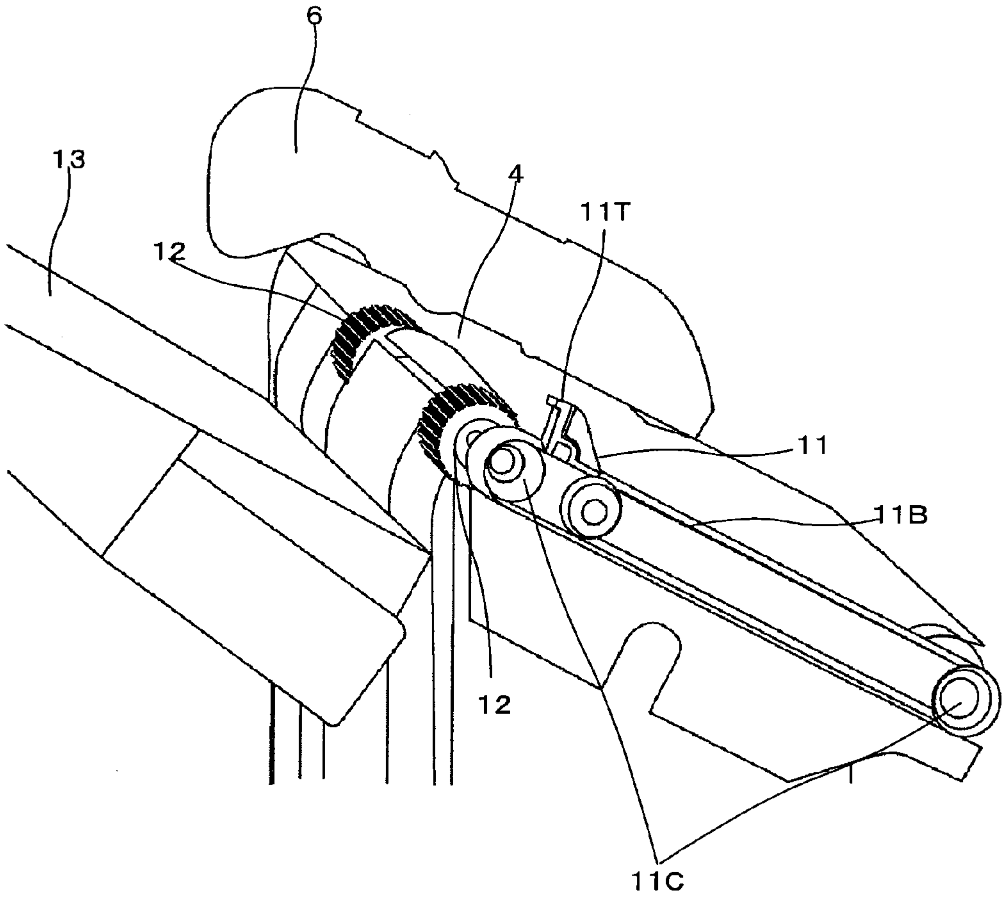
FIG. 4 is a sectional perspective view illustrating the part around the process tray 4 of the sheet post-processing apparatus according to the embodiment.

FIG. 1 is a sectional view illustrating a main part of the sheet post-processing apparatus. FIG. 2 is an external perspective view illustrating a part around a process tray of the sheet post-processing apparatus according to the embodiment. FIG. 3 is an external perspective view illustrating the process tray. FIG. 4 is a sectional perspective view illustrating the part around the process tray of the sheet post-processing apparatus according to the embodiment. Hereinafter, a staple mode of the sheet post-processing apparatus according to the embodiment will be described.

An image forming apparatus discharges sheets having an image formed thereon in the direction indicated by the arrow Q. The sheet post-processing apparatus receives the sheets discharged from the image forming apparatus through inlet rollers 1 and conveys the sheets to outlet rollers 2.

The sheet post-processing apparatus temporarily stacks the sheets P, which are discharged from the outlet rollers 2, on a standby tray 3. The standby tray 3 includes a pair of sheet supporting members (not shown), and the sheet post-processing apparatus moves the sheet supporting members to both outside positions in a direction perpendicular to a sheet conveying direction and then opens the sheet supporting members to drop the sheets stacked thereon to a process tray 4.

Subsequently, the sheet post-processing apparatus guides the conveyed sheets P to rear end stops 4B along the slope of the process tray 4 using a sheet guide 8 so that the rear end of the sheets are positioned in one end of the process tray to serve as a reference surface in a longitudinal alignment. At the same time, the sheet post-processing apparatus longitudinally aligns the rear ends of the sheets using a paddle 5 and longitudinal alignment rollers 7 and transversely aligns the sheets stacked on the process tray 4 using a pair of transverse alignment plates 6.

When the last sheet is conveyed for the stapling process and the transverse and longitudinal alignments are ended, the sheet post-processing apparatus moves a stapler 9 to a predetermined position of a bundle of sheets P to perform the stapling process thereto. The stapling process is generally performed to the corner end of the sheets or multiple positions of the side end thereof.

Before a bundle of stapled sheets are discharged, the sheet post-processing apparatus moves a storage tray 13 to an appropriate standby position on the basis of a detection signal acquired from a sensor S for detecting a position of a top surface of the sheets stacked on the storage tray 13 (height of stacked sheets).

For example, the sheet post-processing apparatus moves down the storage tray 13 to a predetermined position and then moves up the storage tray 13 to a position where the sensor S detects the top surface of stacked sheets. Subsequently, the sheet post-processing apparatus moves down the storage tray 13 by a distance in which the sheets can be appropriately loaded. Accordingly, it is possible to move the storage tray 13 to a standby position where the sheets can be appropriately loaded.

After the stapling process, the sheet post-processing apparatus operates ejectors 10 to feed the bundle of stapled sheets in a sheet feeding direction indicated by the arrow I shown in FIG. 3, and then transmits the bundle of stapled sheets to a bundle hook 11 having moved from a standby position in accordance with rotating motion of a bundle discharge belt 11B which is substantially driven at the same timing as that of the ejectors 10. The bundle hook 11 is located at a home position below the process tray 4 while the bundle discharge belt 11B is not operated.

The bundle discharge belt 11B is wound around bundle discharge belt pulleys 11C disposed on both ends of the process tray 4 in a sheet conveying direction. Additionally, the bundle discharge belt 11B includes, for example, a hook formed in an inverse L-shape, the bundle hook being formed in a flat shape at a position coming into contact with the sheets (see FIG. 4). Subsequently, when a bundle hook driving motor (not shown) is driven to rotate the bundle discharge belt pulleys 11C, the bundle discharge belt 11B is rotated so that the bundle hook 11 moves toward the storage tray 13 along the process tray 4. A conveying speed of paper discharge rollers 12 in the tangential direction (hereinafter, referred to as 'tangential speed') with respect to a conveying speed of the ejectors 10, the bundle hook 11, and the bundle discharge belt 11B are identical with each other or only the tangential speed of the paper discharge rollers 12 is driven at a high speed. Accordingly, it is possible to prevent a jam from occurring in the process tray 4 during a conveying operation.

The sheet post-processing apparatus drives the bundle discharge belt driving motor to rotate the bundle discharge belt pulleys 11C, and discharges and stacks the bundle of stapled sheets on the storage tray 13 using the bundle hook 11. The driving operation of the bundle discharge belt driving motor is carried out, for example, through an encoder control of a stepping motor or a servo motor.

The ejectors 10 and the paper discharge rollers 12 can also perform the feeding operation and the discharging and conveying operations of the bundle of sheets in terms of the driving control operation of the same driving unit (not shown) described above.

Hereinafter, a sort mode of the sheet post-processing apparatus according to the embodiment will be described.

An image forming apparatus discharges the sheets having an image formed thereon in the direction indicated by the arrow Q. The sheet post-processing apparatus receives the sheets discharged from the image forming apparatus through the inlet rollers 1 and conveys the sheets to the outlet rollers 2.

The sheet post-processing apparatus temporarily stacks the sheets P, which are discharged from the outlet rollers 2, on the standby tray 3. The sheet post-processing apparatus opens the standby tray 3 in the transverse direction of the sheets in the same way as described above to drop the stacked sheets to the tray 4.

When a post-process job is not set, the sheet post-processing apparatus does not perform the post process and then discharges the sheets P to the storage tray 13.

Subsequently, the sheet post-processing apparatus aligns the sheets stacked on the process tray 4 using the paddle 5, the transverse alignment plates 6, and the longitudinal rollers 7, and conveys and aligns the subsequently conveyed sheets P on the process tray 3. At this time, the sheet post-processing apparatus sorts a predetermined number of sheets (four to six sheets) using the transverse alignment plates 6. Here, the sorting process is carried out to shift the sheets in the transverse direction perpendicular to the sheet conveying direction. The shift distance is, for example, 15 mm, but may be set arbitrarily.

Subsequently, the sheet post-processing apparatus operates the ejectors 10 to feed a plurality of sorted sheets P and then transmits the plurality of sorted sheets to the hook 11 having moved from the home position as the standby position in accordance with rotating motion of the paper discharge rollers 12 and the bundle discharge belt 11B.

Additionally, the sheet post-processing apparatus rotates the paper discharge rollers 12 and the bundle discharge belt 11B to discharge and stack the plurality of sheets P on the storage tray 13 using the bundle hook 11.

When a bundle of sheets having been subjected to the post process are discharged in a sorted manner, the sheet post-processing apparatus performs the sorting process using the transverse alignment plates 6 after the stapling process described above.

Subsequently, the sheet post-processing apparatus discharges and conveys the sheets in the same manner as described above to thereby stack the sheets on the storage tray 13.

(Operations of Bundle Hook and Paper Discharge Roller)

As shown in FIGS. 1 to 4, the sheet post-processing apparatus includes the paper discharge rollers 12 disposed at the end of the process tray 4 close to the storage tray 13. The sheet post-processing apparatus may include a plurality of paper discharge rollers 12.

As shown in FIG. 3, the paper discharge rollers 12 and the pulley of the bundle discharge belt 11B close to the storage tray 13 have the same rotation shaft. That is, the paper discharge rollers 12 of the process tray 4 and the pulley disposed at the end of the bundle discharge belt 11B in the sheet conveying direction are mounted to the same rotation shaft. Accordingly, it is possible to decrease the size of the sheet post-processing apparatus.

FIGS. 4 to 7 are sectional views illustrating a part around the bundle discharge belt 11B of the sheet post-processing apparatus. When the bundle of sheets are discharged, the sheet post-processing apparatus operates the ejectors 10 to feed a bundle of stapled sheets in the sheet feeding direction and then transmits the plurality of stapled sheets to the hook 11 having moved from the standby position in accordance with rotating motion of the discharger rollers 12 and the bundle discharge belt 11B. Additionally, the sheet post-processing apparatus moves the bundle hook 11 at a high speed from a position close to the stapler 9 to the sheet discharging position shown in FIG. 4. At this time, a speed at which the paper discharge rollers 12 and the bundle of sheets move (hereinafter, referred to as 'tangential speed v1') and a speed at which the bundle hook 11 moves (hereinafter, referred to as 'movement speed v2') are identical with each other. Subsequently, when the bundle discharge belt 11B is rotated at the same speed, a relative movement speed of a bundle hook top 11T becomes faster than the tangential speed v1 at the time the bundle hook 11 is rotated along the outer circumference of the pulleys 11C, and thus a problem arises in that the bundle hook top 11T pinches the sheets in accordance with types of the sheets.

Figure 6:
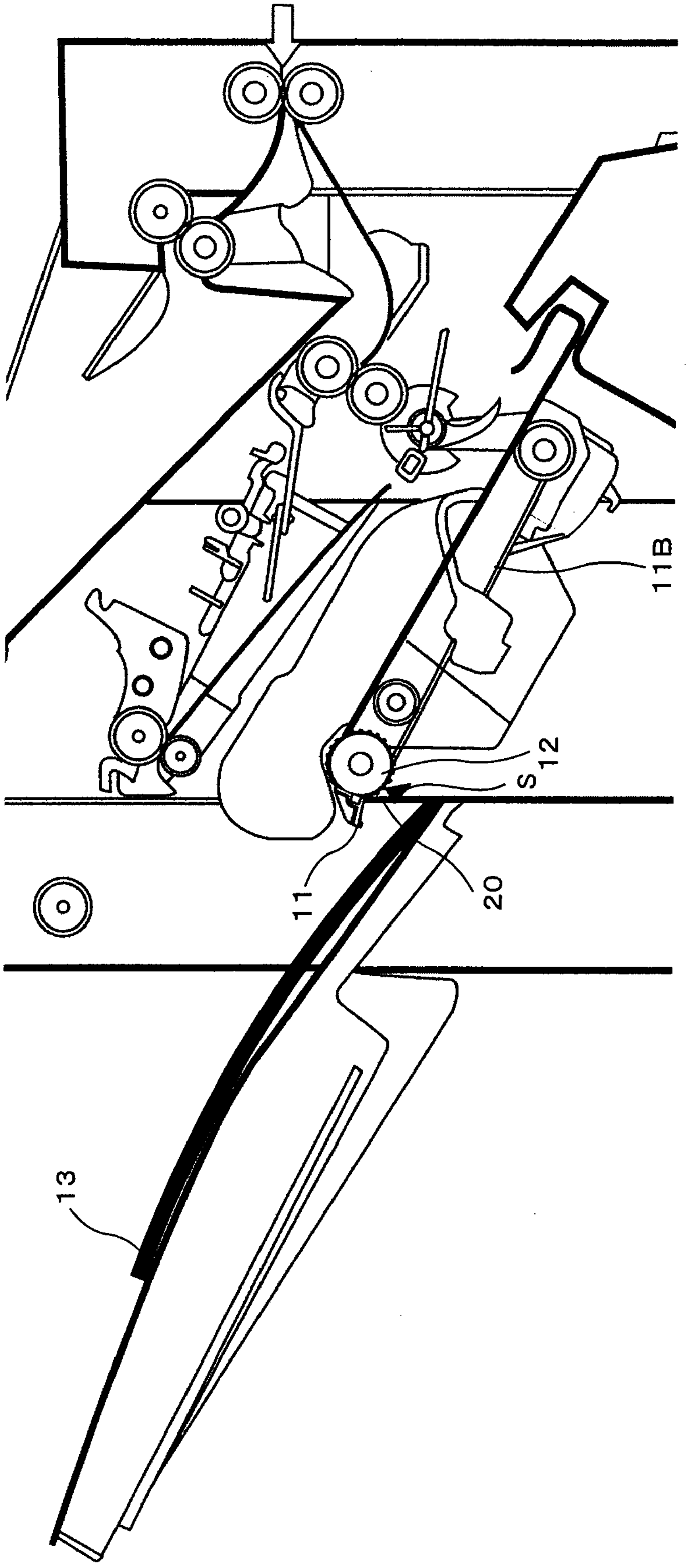
FIG. 6 is a view illustrating the bundle hook 11 at an extrusion position.

The sheet post-processing apparatus according to the embodiment rotates the bundle hook 11 to the extrusion end position shown in FIG. 6. At this time, the tangential speed v1 and the movement speed v2 have a relationship of v1>v2, the tangential speed v1 being faster than the movement speed v2.

The sheet post-processing apparatus discharges the bundle of sheets to the storage tray 13 using the paper discharge rollers 12 in accordance with the rotation of the paper discharge rollers 12. At this time, the bundle hook 11 auxiliary extrudes the bundle of sheets while supporting the rear ends of the sheets.

Additionally, the movement of the bundle hook 11 and the rotation of the paper discharge rollers 12 are not stopped at the same time. Since the movement of the bundle hook 11 is not stopped, a loss of time that the bundle hook 11 returns to the home position does not occur.

Figure 7:
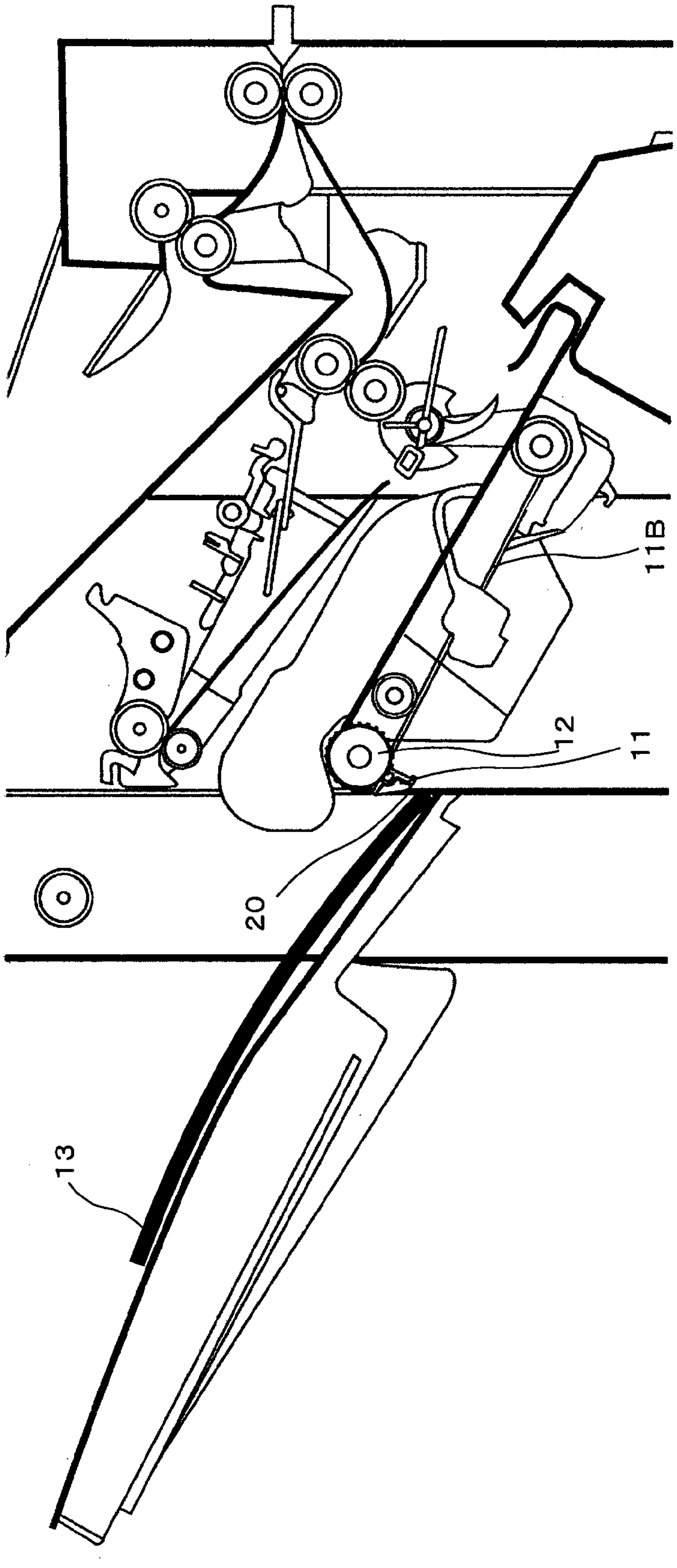
FIG. 7 is a view illustrating the bundle hook 11 at a bundle hook return and start position.

Subsequently, as shown in FIG. 7, the sheet post-processing apparatus moves the bundle hook 11 to a bundle hook return and start position where the bundle hook 11 completely passes a sheet rear end contacting member 20. When the bundle hook 11 reaches the discharge end position where the bundle hook 11 completely extrudes the bundle of sheets, the sheet post-processing apparatus stops the paper discharge rollers 12 and then moves the bundle hook 11 at a lower speed. Since the bundle hook 11 is rotated at the lower speed, the bundle of sheets are not scratched or damaged by the bundle hook 11 while dropping the sheets.

Subsequently, the sheet post-processing apparatus returns the bundle hook 11 to the home position at a high speed.

Figure 8:
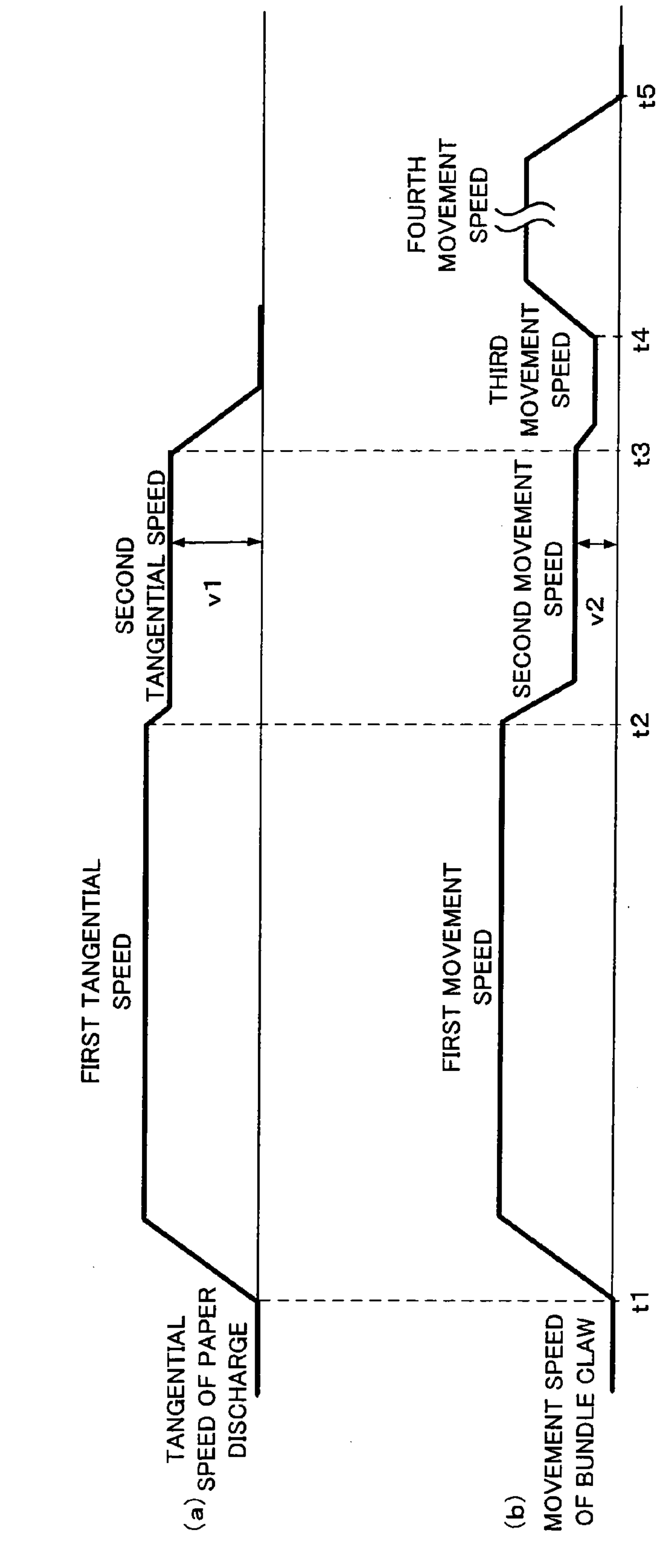
FIG. 8 is a timing chart illustrating a relationship between a tangential speed V1 and a bundle hook speed V2.

FIG. 8 is a timing chart illustrating a relationship between the tangential speed v1 and the movement speed v2. The timing chart shown in FIG. 8(*a*) illustrates the tangential speed v1 of the paper discharge rollers 12 and the timing chart shown in FIG. 8(*b*) illustrates the movement speed v2.

Figure 5:
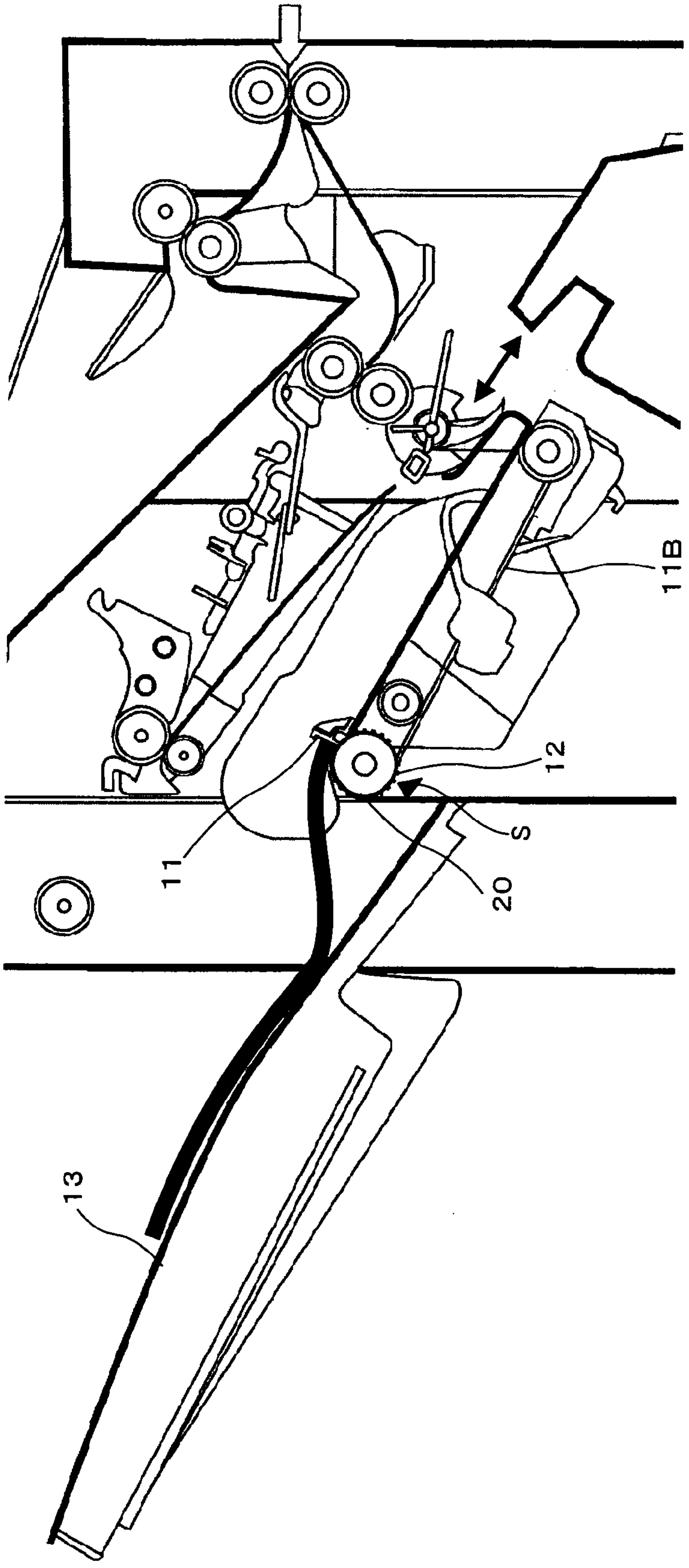
FIG. 5 is a view illustrating a bundle hook 11 at a sheet discharging position.

The time t1 indicates the discharge and convey start time, the time t2 indicates a time when the bundle hook 11 reaches the convey end (discharge start) position shown in FIG. 5, the time t3 indicates a time when the bundle hook 11 reaches the discharge end position shown in FIG. 6, and the time t4 indicates a time when the bundle hook 11 reaches a bundle hook return and start position shown in FIG. 7, respectively.

In the discharging and conveying operations from t1 to t2, the tangential speed v1 and the first movement speed v2 are identical with each other. In the discharging and conveying operations from t2 to t3, the second tangential speed v1 and the second movement speed v2 are slower than those in the region from t1 to t2. Additionally, in the region from t2 to t3, the second tangential speed v1 is faster than the second movement speed v2. In the stacking operation from t2 to t4, when the bundle hook 11 reaches the time t3, the sheet post-processing apparatus stops the rotation of the discharges rollers 12. In the region from t3 to t4, the sheet post-processing apparatus moves the bundle hook 11 at a lower speed.

That is, in the sheet stacking operation in which the bundle hook 11 passes the discharge start position of the sheets P to the sheet rear end contacting member 20 on the storage tray 13 and then reaches the home position return and start position, a relationship between the tangential speed v1 and the movement speed v2 can be expressed as follows. The first tangential speed v1(t1→t2)=the first movement speed v2(t1→t2), the second tangential speed v1(t2→t3)>the second movement speed v2(t2→t3), and the first movement speed v2 (t1→t2)>the second movement speed v2(t2→t3)>the third movement speed v2(t3→t4).

The sheet post-processing apparatus moves the bundle hook 11 at a high speed in a region from t4 to t5 (home position return position) of the bundle hook 11.

That is, the tangential speed v1 of the paper discharge rollers 12 has a relationship of v1=0, so that the paper discharge rollers 12 stop rotating. Additionally, the fourth movement speed v2(t4→t5) of the bundle hook≧the first movement speed v2(t1→t2).

As described above, when the bundle of sheets are discharged, the sheet post-processing apparatus does not stop the movement of the bundle hook 11 and allows the tangential speed v1 to be faster than the movement speed v2 until the bundle hook 11 reaches the extrusion end position (t3) in which the bundle of sheets stacked on the process tray 4 are completely extruded. Since the sheet post-processing apparatus decelerates the tangential speed of the paper discharge roller during the discharging operation, the bundle hook 11 performs the discharging operation while smoothly moving on a surface of the storage tray or a top surface of the stacked sheets. Then, the bundle hook 11 is rotated at a lower speed until the bundle hook 11 passes the discharge end position to the bundle hook return and start position (t4) in which the bundle hook 11 is inserted into a housing.

Accordingly, it is possible to prevent the rear end of the sheets from being damaged by the bundle hook 11.

Additionally, when the bundle hook 11 discharges sheets which can be easily bended, it is possible to prevent a sheet conveying error occurring when the bundle hook 11 pinches the sheet rear end and it is possible to improve sheet stacking capability. Accordingly, it is possible to stably discharge and stack the bundle of sheets having been subjected to the post process such as the sorting process and the stapling process without the conveying and discharging errors.

(Bundle Hook Alignment Member)

Figure 9:
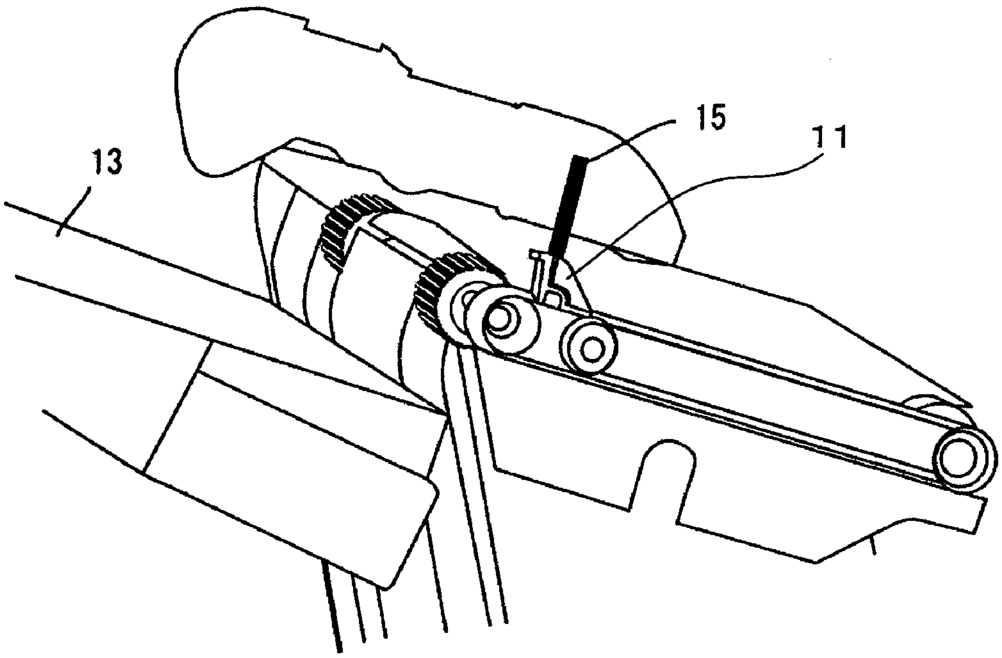
FIG. 9 is a perspective view illustrating the bundle hook 11 having a bundle hook alignment member 15.

FIG. 9 is a perspective view illustrating the bundle hook 11 having a bundle hook alignment member 15. As shown in FIG. 9, the sheet aligning unit according to the embodiment may include the bundle hook alignment member 15 formed at the top of the bundle hook 11 so as to longitudinally align the sheets discharged on the storage tray 13.

The bundle hook alignment member 15 is formed of an elastic member such as rubber. When the bundle hook 11 moves from the discharge position to the return position, the sheet post-processing apparatus longitudinally aligns the sheets discharges on the storage tray 13 by pulling the sheets discharged thereon to come into contact with the sheet rear end contacting member 20 by use of the bundle hook alignment member 15.

The bundle hook alignment member 15 has a sufficient length to longitudinally align the sheets.

Alternatively, the sheet post-processing apparatus may include one or more bundle hook alignment members 15 provided on the bundle discharge belt 11B so as to longitudinally align the sheets discharged on the storage tray 13.

As described above, the sheet post-processing apparatus according to the embodiment includes the bundle hook alignment member 15 provided at the top of the bundle hook 11. Accordingly, since the bundle hook alignment member 15 rotates to longitudinally align the sheets discharged on the storage tray 13 in a region from the discharge end position (t3) to the stack end position (t4), it is possible to improve sheet stacking capability. As a result, it is possible to stably carry out the discharging and stacking operations.

(Configuration and Operation of Sheet Pressing Guide Mechanism)

Figure 10A:
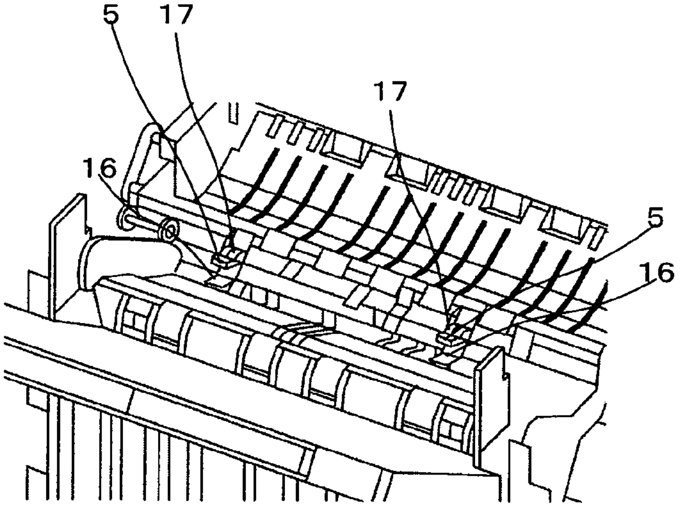
FIG. 10A is an external perspective view illustrating a part around a sheet pressing guide mechanism of the sheet post-processing apparatus according to the embodiment.
Figure 10B:
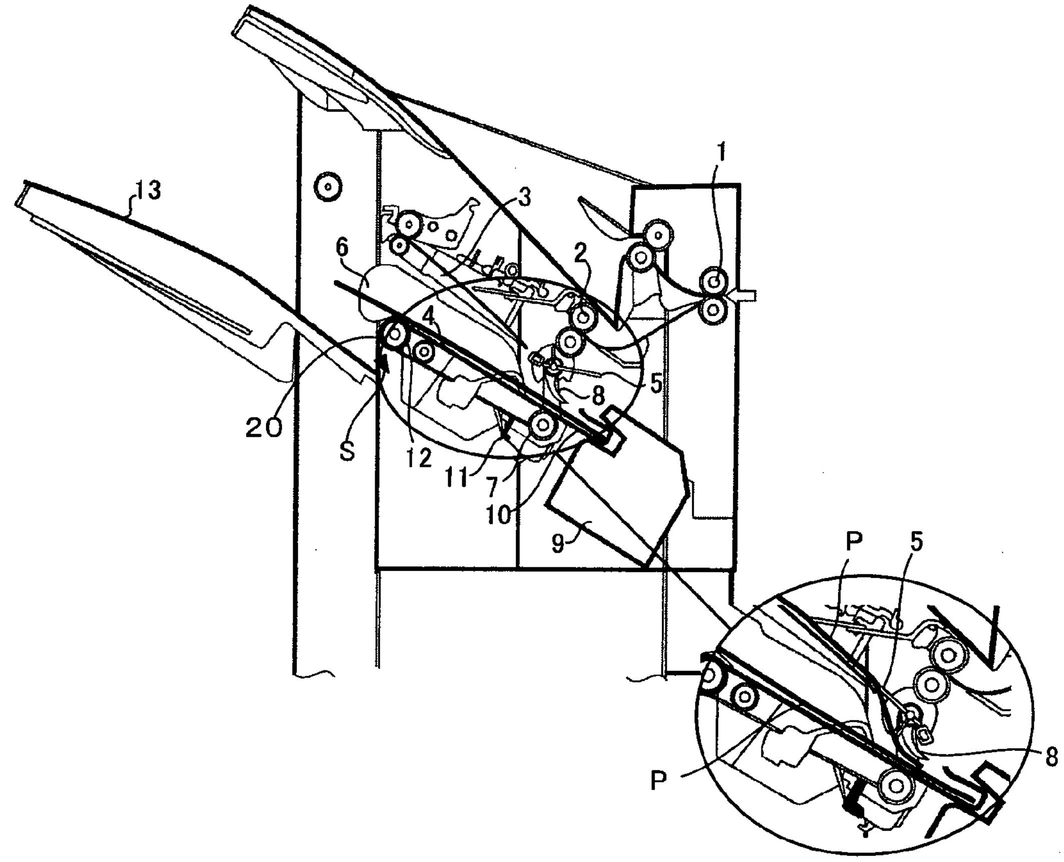
FIG. 10B is a side sectional view illustrating a part around the sheet pressing guide mechanism.

FIG. 10A is an external perspective view illustrating a part around the sheet pressing guide mechanism of the sheet post-processing apparatus according to the embodiment. FIG. 10B is a side sectional view illustrating the part around the sheet pressing guide mechanism.

As shown in FIG. 10A, the sheet post-processing apparatus includes the paddle 5 for longitudinally align the sheets P conveyed to the process tray 4. The paddle 5 is provided on a rotating spool 17.

As shown in FIG. 10B, when the sheets P are conveyed, the spool 17 is rotated in the direction indicated by the arrow, and thus the paddle 5 guides the sheets in the sheet conveying direction to thereby longitudinally align the sheets.

The sheet post-processing apparatus includes a sheet pressing guide member 16 which is radially unfolded with respect to the rotation shaft of the spool 17.

Figure 11A:
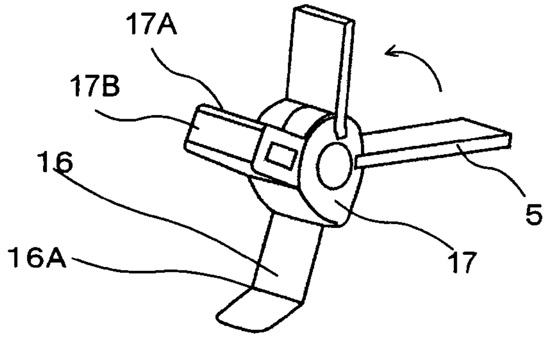
FIG. 11A is a view illustrating a state where a sheet pressing guide member 16 is unfolded.

FIG. 11A is a view illustrating a state before the sheet pressing guide member 16 comes into contact with the sheets. As shown in FIG. 11A, at a position opposed to the process tray 4 (see FIG. 1), the sheet pressing guide member 16 is bent convex in the sheet stack surface direction. At this time, the bent angle θ is an obtuse angle.

The sheet pressing guide member 16 is formed of a flexible member. An example of the flexible member includes a plastic sheet and a stainless plate, but the example is not limited thereto.

Figure 11B:
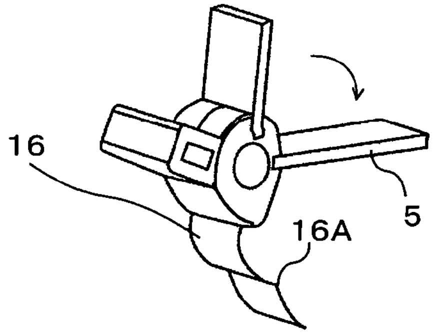
FIG. 11B is a view illustrating a state where a spool 17 is inverted so that the sheet pressing guide member 16 presses a sheet.

FIG. 11B is a view illustrating a state where the spool 17 is inverted so that the sheet pressing guide member 16 presses the sheets. As shown in FIG. 11B, when the spool 17 is inverted, the sheet pressing guide member 16 presses the sheets by elastic force generated from a bent portion thereof.

That is, since the sheet pressing guide member 16 includes the bent portion 16A, it is possible to strongly press the sheets by the elastic force compared with the case without the bent portion 16A.

Figure 12:
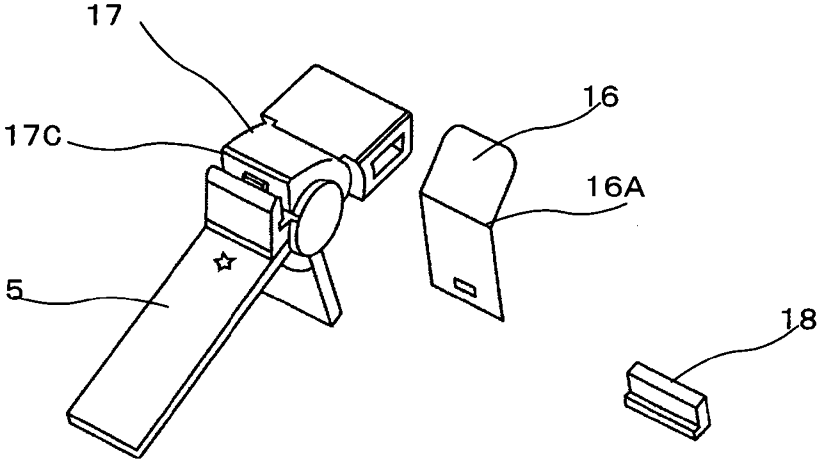
FIG. 12 is an exploded perspective view illustrating the sheet pressing guide mechanism.

FIG. 12 is an exploded perspective view illustrating the sheet pressing guide member 16. As shown in FIG. 12, it is possible to fix the sheet pressing member 16 to the spool 17 in such a manner that the sheet pressing guide member 16 is mounted to a fixed groove 17C having a width larger than that of the sheet pressing guide member 16 of the spool 17 and then a fixed member 18 formed of an elastic member is fitted to the fixed groove 17C.

Figure 13:
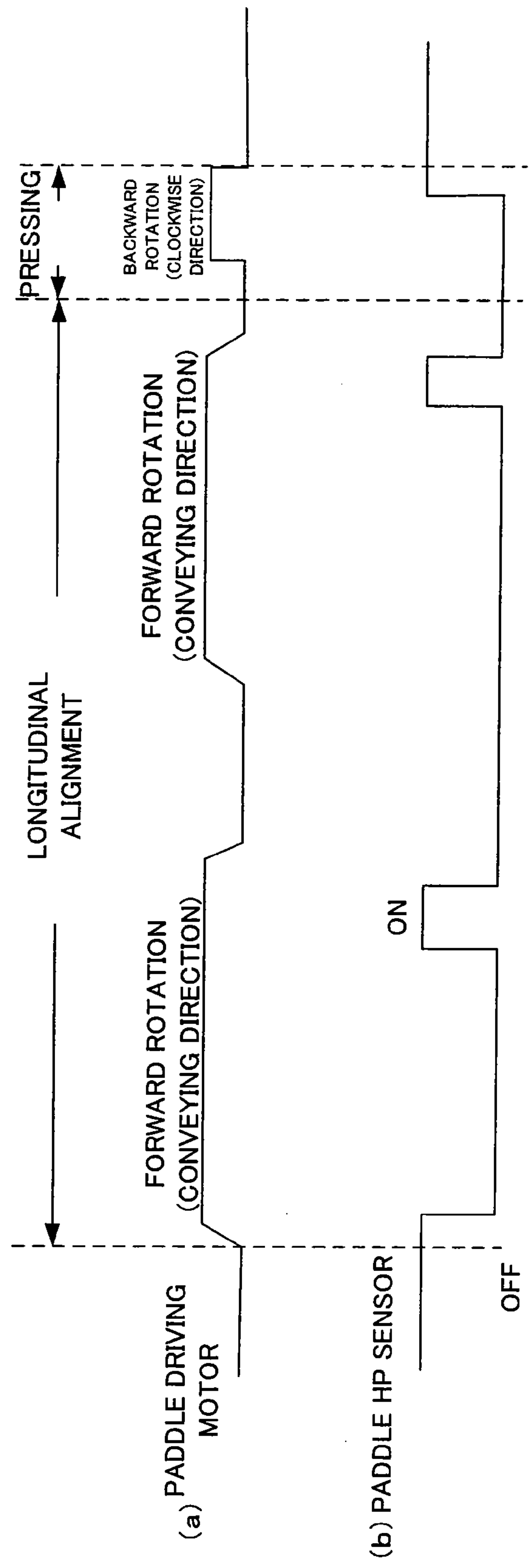
FIG. 13 is a timing chart illustrating an operation of the sheet pressing guide member 16.

FIG. 13 is a timing chart illustrating an operation of the sheet pressing guide mechanism. The timing chart (a) illustrates an operation of the spool 17, and the timing chart (b) illustrates a home position sensor state of the paddle 5.

As shown in FIG. 13, the spool 17 is rotated in the direction where the sheets are longitudinally aligned and the paddle driving motor is stopped after a paddle home position sensor detects that the paddle 5 passes the home position two times. Then, the spool 17 is rotated backward until the paddle home position sensor becomes an ON state and then is stopped again. Accordingly, the sheet pressing guide member 16 can press the sheets by elastic force generated from the bent portion 16A. At this time, the paddle 5 is returned and stopped at the home position (see FIG. 13). The home position of the paddle 5 is shown in FIG. 1. A rear end supporting surface 17A of the sheets stacked on the standby tray 3 shown in FIG. 11A is substantially maintained at the same plane as the sheet stack surface of the standby tray 3.

Accordingly, the sheet post-processing apparatus according to the embodiment includes the sheet pressing guide member 16 which has the bent portion and which is formed of a flexible member. When the sheet pressing guide member 16 is rotated backward after the sheet conveying operation, the sheet pressing guide member 16 presses the top surface of the sheets discharged and stacked on the process tray 4.

Figure 11C:
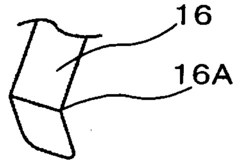
FIG. 11C is a view illustrating a sheet pressing guide member 16 bent concave to the process tray 4.

When the bent portion 16A is formed in an obtuse angle in the direction where the spool 17 is rotated forward, that is, the bent portion 16A is formed in the direction opposite to FIG. 11A and is bent concave to the process tray 4 (see FIG. 11C), the spool 17 is just rotated forward in the direction where the sheets are longitudinally aligned and needs not to be rotated backward.

As described above, it is possible to prevent the sheets from being misaligned at the time of dropping the sheets by the action of the sheet pressing guide member 16, and it is possible to prevent a gap from occurring between the sheets. Accordingly, it is possible to improve sheet stacking capability and to prevent the sheets from being misaligned during the stapling process. As a result, it is possible to stably stack the sheets on the process tray 4.

(Shape of Leading End of Bundle Hook)

Figure 14:
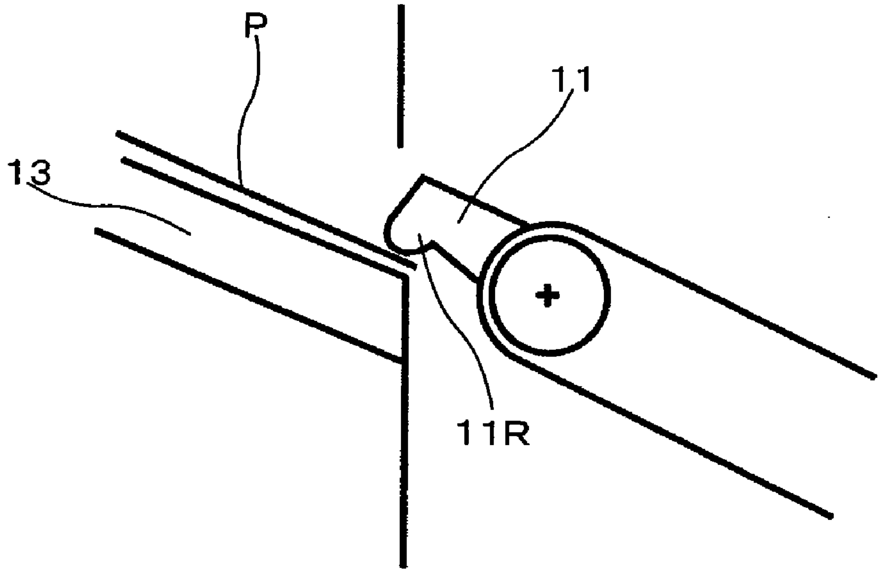
FIG. 14 is a side view illustrating the bundle hook 11 having the leading end 11R formed in a round shape.

FIG. 14 is side view illustrating the bundle hook 11 having the leading end 11R formed in a round shape. As shown in FIG. 14, the sheet post-processing apparatus according to the embodiment may include the bundle hook 11 of which the leading end 11R is formed in a round shape.

Figure 15:
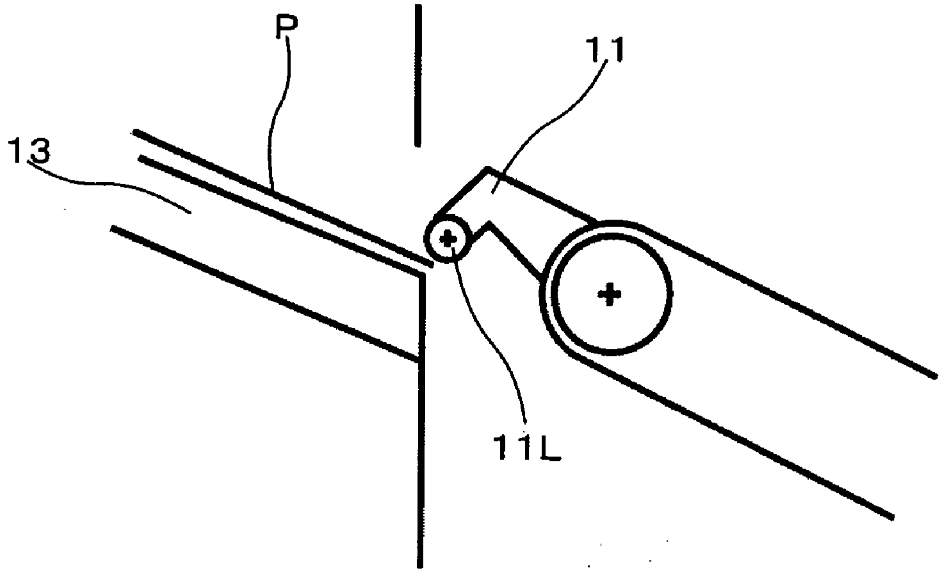
FIG. 15 is a side view illustrating the bundle hook 11 having a roller 11L formed in the leading end thereof so as to rotate.

FIG. 15 is a side view illustrating the bundle 11 having a roller 11L formed in the leading end thereof so as to rotate. Alternatively, as shown in FIG. 15, the sheet post-processing apparatus according to the embodiment may include the bundle hook 11 of which the roller 11L is formed in the leading end thereof so as to rotate.

As described above, the sheet post-processing apparatus according to the invention may include the bundle hook 11 of which the leading end 11R is formed in a round shape or the bundle hook 11 of which the roller 11L is formed in the leading end thereof so as to rotate. Accordingly, when the sheet post-processing apparatus cannot extrude completely the sheets to the storage tray 13 and the bundle hook 11 comes in contact with the sheets, the bundle hook 11 smoothly comes in contact with the sheets. Thus, it is possible to prevent the bundle hook 11 from pinching the rear ends of the sheets, thereby improving sheet stacking capability. As a result, it is possible to stably carry out the conveying and stacking operations without the conveying and discharging errors of a bundle of the sheets having been subjected to the post process.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A sheet post-processing apparatus comprising:

a process tray which stacks a sheet thereon;

a storage tray which stacks the sheet discharged from the process tray thereon;

a paper discharge roller which is provided at the end of the process tray in a sheet discharging and conveying direction to discharge the sheet to the storage tray;

a bundle hook which is provided in a bundle discharge belt rotating in the sheet discharging and conveying direction of the process tray to discharge and convey the sheet stacked on the process tray in the storage tray direction; and a driving source configured to decelerate a tangential speed at which the paper discharge roller discharges the sheet and a movement speed of the bundle hook from a first movement speed to a second movement speed at which the bundle hook discharges and conveys the sheet in accordance with a rotation position of the bundle hook so that the second movement speed of the bundle hook is slower than the tangential speed of the paper discharge roller during a sheet stacking operation in which the bundle hook passes from a discharge start position of the sheet to a sheet rear end contacting member of the process tray, wherein, when the bundle hook passes from the sheet rear end contacting member and returns to a home position, the movement speed of the bundle hook is set at a fourth movement speed which is faster than the second movement speed and slower than the first movement speed.

2. The sheet post-processing apparatus according to claim 1, wherein when the bundle hook moves from a home position to the discharge start position, a tangential speed of the paper discharge roller and a movement speed of the bundle hook are identical with each other, and wherein when the bundle hook moves from the discharge start position to a discharge end position, the tangential speed of the paper discharge roller and the movement speed of the bundle hook are decelerated such that the movement speed of the bundle hook is slower than the tangential speed of the paper discharge roller.

3. The sheet post-processing apparatus according to claim 1, wherein when the bundle hook reaches a discharge end position during the sheet stacking operation, the paper discharge roller stops rotating and the movement speed of the bundle hook becomes faster than that during the sheet stacking operation.

4. The sheet post-processing apparatus according to claim 1, wherein the paper discharge roller is mounted on the same rotation shaft as a pulley provided at the end of the bundle discharge belt in the sheet discharging and conveying direction.

5. The sheet post-processing apparatus according to claim 1, further comprising:

a bundle hook alignment member which is formed at the top of the bundle hook, the bundle hook alignment member being formed of an elastic member and longitudinally aligning the sheet stacked on the storage tray.

6. The sheet post-processing apparatus according to claim 1, further comprising:

a spool which includes a paddle for longitudinally aligning the sheet conveyed to the process tray and a sheet pressing guide member for pressing the longitudinally aligned sheet, the paddle and the sheet pressing guide member being radially provided with respect to a rotation shaft, and wherein the sheet pressing member is formed of a flexible member and has a bent portion formed at an obtuse angle.

7. The sheet post-processing apparatus according to claim 1, wherein the leading end of the bundle hook is formed in a round shape.

8. The sheet post-processing apparatus according to claim 1, wherein the bundle hook is provided with a roller at the leading end.

9. The sheet post-processing apparatus according to claim 6, wherein the bent portion of the sheet pressing guide member is bent convex to the process tray, and wherein when the spool is rotated forward in a sheet aligning direction, the sheet is longitudinally aligned by the paddle, and when the spool is rotated backward, the sheet is pressed by the sheet pressing guide member.

10. The sheet post-processing apparatus according to claim 6, wherein the bent portion of the sheet pressing guide member is bent concave to the process tray, and wherein when the spool is rotated forward, the sheet is longitudinally aligned by the paddle, and when the spool is rotated forward, the sheet is pressed by the sheet pressing guide member.

* * * * *